(12) United States Patent
Whitney et al.

(10) Patent No.: US 8,673,120 B2
(45) Date of Patent: Mar. 18, 2014

(54) EFFICIENT BORON NITRIDE NANOTUBE FORMATION VIA COMBINED LASER-GAS FLOW LEVITATION

(75) Inventors: R. Roy Whitney, Newport News, VA (US); Kevin Jordan, Newport News, VA (US); Michael W. Smith, Newport News, VA (US)

(73) Assignees: Jefferson Science Associates, LLC, Newport News, VA (US); The United States of America, as Represented by the Administrator of NASA, Washington, DC (US)

( * ) Notice: Subject to any disclaimer, the term of this patent is extended or adjusted under 35 U.S.C. 154(b) by 155 days.

(21) Appl. No.: 13/200,316

(22) Filed: Sep. 22, 2011

(65) Prior Publication Data

US 2012/0168299 A1 Jul. 5, 2012

Related U.S. Application Data

(60) Provisional application No. 61/460,534, filed on Jan. 4, 2011.

(51) Int. Cl.
*B01J 19/12* (2006.01)

(52) U.S. Cl.
USPC ............ 204/157.41; 204/157.45; 204/157.47; 204/157.46

(58) Field of Classification Search
USPC .............. 204/157.45, 157.46, 157.41, 157.47
See application file for complete search history.

(56) References Cited

U.S. PATENT DOCUMENTS

| | | | |
|---|---|---|---|
| 3,562,530 A * | 2/1971 | Consoli et al. ................ 250/251 |
| 3,580,731 A | 5/1971 | Milewski et al. |
| 3,808,550 A * | 4/1974 | Ashkin ........................... 372/97 |
| 5,814,152 A | 9/1998 | Thaler |
| 6,331,477 B1 * | 12/2001 | Vekris et al. ............ 257/E21.14 |
| 6,484,539 B1 | 11/2002 | Nordine et al. |
| 6,967,011 B1 * | 11/2005 | Saboungi et al. ............. 423/249 |
| 7,291,317 B1 | 11/2007 | Saboungi et al. |
| 8,028,541 B2 * | 10/2011 | Yono et al. .................... 423/297 |
| 8,206,674 B2 * | 6/2012 | Smith et al. ................ 204/157.4 |
| 2004/0063113 A1 | 4/2004 | Agnes et al. |
| 2004/0179808 A1 | 9/2004 | Renn |
| 2008/0224100 A1 | 9/2008 | Smalley et al. |
| 2009/0117021 A1 | 5/2009 | Smith et al. |
| 2010/0192535 A1 | 8/2010 | Smith et al. |

FOREIGN PATENT DOCUMENTS

JP 2001270707 10/2001

OTHER PUBLICATIONS

Glorieux et al, "Electronic conduction in liquid boron," Europhys. Lett., 56 (1) pp. 81-85 (2001).*

Millot et al, "High-temperature properties of liquid boron from contactless techniques," Intl. J. Thermophys., vol. 23, No. 5, Sep. 2002, pp. 1185-1195.*

(Continued)

*Primary Examiner* — Keith Hendricks
*Assistant Examiner* — Colleen M Raphael

(57) ABSTRACT

A process for producing boron nitride nanotubes and/or boron-carbon-nitrogen nanotubes of the general formula $B_xC_yN_z$. The process utilizes a combination of laser light and nitrogen gas flow to support a boron ball target during heating of the boron ball target and production of a boron vapor plume which reacts with nitrogen or nitrogen and carbon to produce boron nitride nanotubes and/or boron-carbon-nitrogen nanotubes of the general formula $B_xC_yN_z$.

20 Claims, 2 Drawing Sheets

(56) References Cited

OTHER PUBLICATIONS

Kim et al, "Double-walled boron nitride nanotubes grown by floating catalyst chemical vapor deposition," Nano Letters 2008, vol. 8, No. 10, pp. 3298-3302 (with supporting information).*

Okada et al, "Viscosity of liquid boron," Phys. Rev. B 81, 140201(R) (2010).*

Yu et al,"Synthesis of boron nitride nanotubes by means of excimer laser ablation at high temperature," Appl. Phys. Lett., vol. 72, No. 16, Apr. 20, 1998, pp. 1966-1968.*

Arenal, "Root-growth mechanism for single-walled boron nitride nanotubes in laser vaporization technique," JACS Articles 2007, vol. 129, pp. 16183-16189.*

Smith, M.W. et al., Very Long single- and Few-walled Boron nitride Nanotubes via the Pressurized Vapor/condenser Method; Nanotechnology 20 (2009) 505604.

Ma, Renzhi et al., Synthesis and Properties of B—C—N and BN Nanostructure, Phil. Tran.:Math., Phys. and Eng. Sciences, vol. 362, No. 1823, (Oct. 15, 2004), pp. 2161-2186.

Goldberg, Dmitri et al., Nanotubes in Boron Nitride Laser Heated at High Pressure, Appl. Phys. Lett. 69 (14), Sep. 30, 1996, 2045-2047.

Goldberg, Dmitri et al., Boron Nitride Nanotubes, Adv. Mater., 2007, 19, 2413-2434.

Zhi, Chunyi et al., Effective Precursor for High Yield Synthesis of Pure BN Nanotubes, Solid State Communications 135 (2005) 67-70.

Bansal, Narottam et al., Boron Nitride Nanotubes—Reinforced Glass Composites, NASA/TM 2005-213874, Aug. 2005.

* cited by examiner

EFFICIENT BORON NITRIDE NANOTUBE FORMATION VIA COMBINED LASER-GAS FLOW LEVITATION

This application claims the benefit of U.S. Provisional Application No. 61/460,534 filed on Jan. 4, 2011 for Efficient Boron Nitride Nanotube (BNNT) & BxCyNz Formation Via Combined Laser-Gas Flow Levitation incorporated herein by reference in its entirety.

The United States government may have certain rights to this invention under The National Aeronautics and Space Administration and/or Management and Operating Contract No. DE-AC05-06OR23177 from the Department of Energy.

FIELD OF THE INVENTION

The invention relates generally to the production of nanotubes and in particular to the formation of long-strand boron nitride and boron carbon and nitrogen ($B_xC_yN_z$) nanotubes.

BACKGROUND

Since the announcement of the successful synthesis of high-aspect-ratio-few-walled boron nitride nanotubes (FW-BNNTs) in 1995, little progress had been made until very recently in the scale-up of their synthesis. In spite of the theoretical capabilities of FW-BNNTs to provide high strength-to weight, high temperature resistance, piezo actuation, and radiation shielding (via the boron content), the aerospace industry has had to rely on micron-sized graphite or boron materials for structural applications. Further, despite their very desirable properties, neither FW-BNNTs nor single wall carbon nanotubes are used widely in aerospace manufacturing and similar industries, as industries are generally unwilling to pay the premium price for these high performance materials.

Prior to recent inventions of the present inventors, high-aspect ratio FW-BNNTs had only been produced in small amounts (from individual tubes to milligrams) by arc-discharge or laser heating methods. Further, these small amounts of FW-BNNTs were in the form of films not strands or fibers several centimeters in length. A separate class of boron nitride nanotubes know in the prior has been produced by chemical vapor deposition of nitrogen compounds (e.g. ammonia) over ball-milled precursors, but these tubes are of large diameter, and do not exhibit the continuous crystalline sp2-type bonding structure which has drawn most theoretical interest.

The Inventors' recent work in the field of boron nitride nanotubes is described in three U.S. patent application Ser. No. 12/152,414 filed May 14, 2008, U.S. patent application Ser. No. 12/322,591 filed Feb. 4, 2009 and U.S. patent application Ser. No. 12/387,703 filed May 6, 2009 incorporated herein by reference in their entirety and Inventor's article "Very Long Single- and Few-walled Boron Nitride Nanotubes Via the Pressurized Vapor/condenser Method" by Smith, Jordan, Park, Kim Lillehei, Crooks and Harrison; Nanotechnology 20 (2009) 505604. Inventors' U.S. patent application Ser. No. 12/152,414, describes the generation of very long single- and few-walled boron nitride nanotubes (BNNT) via a pressurized vapor/condenser method. In the pressurized vapor/condenser method few walled boron nitride nanotubes fibers grow continuously by surface nucleation from seemingly arbitrary asperities at a high linear rate (many cm per sec) in the line of flow of vaporized boron produced from a solid boron containing target mixed with nitrogen under elevated pressures.

Boron nitride nanotubes have electrical insulating properties in contrast to carbon nanotubes which are electrical conductors. This means that boron nanotubes with insulating properties have very different potential applications than carbon nanotubes which conduct. Accordingly, nanotubes, which combine boron nitride with carbon, are of considerable interest because of their potential as semiconductors.

While the pressurized vapor/condenser method has significant advantages over the prior art the energy efficiency of the pressurized vapor/condenser method is relatively low due to a large loss of heat to the solid boron support that is used both to supply and support the boron target being vaporized by the heat source (laser) driving the process.

Hence a method for producing boron nitride nanomaterials in a more energy efficient manner is highly desirable.

SUMMARY OF INVENTION

The invention provides process for producing boron nitride nanotubes. The process comprising the steps of (a) providing a boron ball target, a first laser beam having an adjustable power level and a gas flow comprising nitrogen; (b) positioning the boron ball target in a reaction position above the first laser beam and in the gas flow, the reaction position comprising a vertical reaction position and a horizontal reaction position; (c) adjusting the power level of the first laser beam to provide sufficient force from the first laser beam to the boron ball target to balance the force of gravity and the force of a light from above the boron ball target acting downward on the boron ball target and maintain the boron ball target in the vertical reaction position; (d) heating the boron ball target with the first laser beam wherein the heating evaporates a portion of the boron ball target and forms a boron vapor plume; (e) adjusting the power level of the first laser beam to maintain the heated boron ball target balanced in the vertical reaction position as the boron vapor plume moves upward from the boron ball target; (f) providing at least one second laser beam positioned above and to the side of the boron ball target, wherein the at least one second laser beam exerts a second laser beam force to maintain the heated boron ball target balanced in the horizontal reaction position; and (g) forming a plurality of boron nitride nanotubes as the upward moving boron vapor plume contacts the nitrogen in the gas flow.

The invention also provides a process for producing boron-carbon-nitrogen nanotubes of the general formula $B_xC_yN_z$. The process comprising the steps of (a) providing a boron ball target, a first laser beam having an adjustable power level, a gas flow comprising nitrogen, and a carbon source; (b) positioning the boron ball target in a reaction position above the first laser beam and in the gas flow, the reaction position comprising a vertical reaction position and a horizontal reaction position; (c) adjusting the power level of the first laser beam to provide sufficient force from the first laser beam to the boron ball target to balance the force of gravity and the force of a light from above the boron ball target acting downward on the boron ball target and maintain the boron ball target in the vertical reaction position; (d) heating the boron ball target with the first laser beam wherein the heating evaporates a portion of the boron ball target and forms a boron vapor plume and vaporizes the carbon source to form carbon atoms; (e) adjusting the power level of the first laser beam to maintain the heated boron ball target balanced in the vertical reaction position as the boron vapor plume moves upward from the boron ball target; (f) providing at least one second laser beam positioned above and to the side of the boron ball target, wherein the at least one second laser beam exerts a second laser beam force to maintain the heated boron ball target balanced in the horizontal reaction position; and (g) forming a plurality of boron-carbon-nitrogen nanotubes of the general formula $B_xC_yN_z$ as the upward moving boron vapor plume contacts the nitrogen in the gas flow and carbon atoms.

DETAILED DESCRIPTION OF THE INVENTION

The process described herein utilizes a combination of laser light and nitrogen gas flow to support a boron ball target during heating of the boron ball target and production of a boron vapor plume.

Boron nitride nanotubes are formed when hot boron vapor (about 4000° C.) from a boron ball target combines with atomic nitrogen near the correct 1:1 stoichiometric ratio. If a source of carbon is present with the hot boron and atomic nitrogen, boron-carbon-nitrogen nanotubes of the general formula $B_xC_yN_z$ are formed. The carbon may be supplied as a carbon rich gas such as methane or acetylene that is mixed with the nitrogen gas that is supplied to the reaction system or alternatively may be solid carbon such as carbon fibers, carbon powder or graphite included in a solid boron target which is vaporized as the boron is vaporized. Lasers including, but not limited to a free electron laser(s), a fiber laser(s), a solid state laser(s), or a gas laser(s) including standard commercial $CO_2$ laser(s) may supply the energy for the process of the invention, for example. The laser(s) should be sufficiently powerful to produce a laser beam(s) that maintain the hot boron ball target in the reaction position and heat the boron ball target to produce boron vapor. The light from the laser beam both directly heats the boron and indirectly heats nitrogen gas flowing past the boron ball to disassociate the nitrogen gas into atomic nitrogen.

Figure 1:
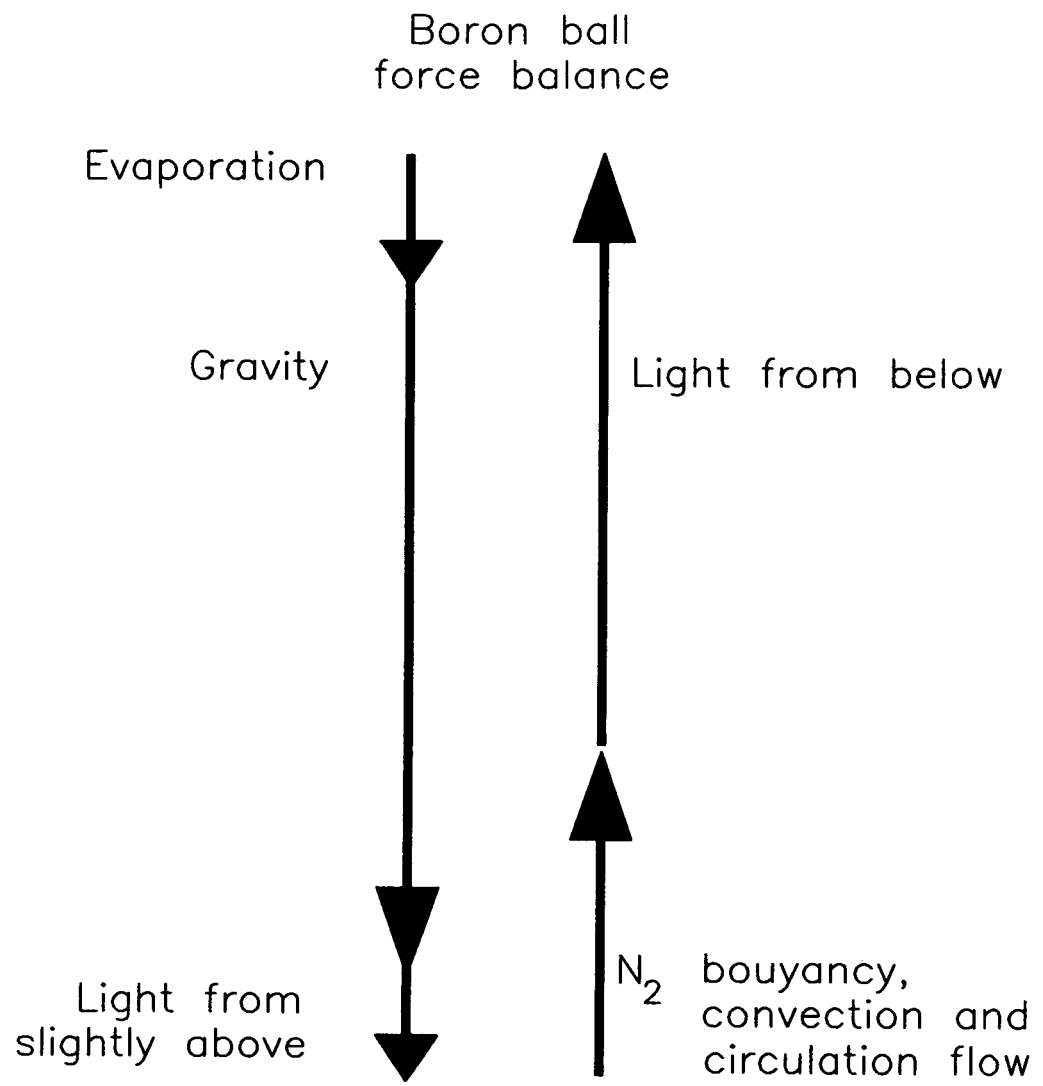
FIG. 1 is a schematic representation of the forces acting on the boron ball target in the in combined laser-gas flow levitation process.

Referring to FIG. 1 which is a schematic representation of the forces acting on the boron ball target in the combined laser-gas flow levitation process. As the diagram shows the boron ball target experiences upward forces from nitrogen gas buoyancy, convection and circulation flow and the laser light from below; and downward forces due to evaporation of boron vapor from the boron ball target, gravity and light from above and slightly to the side of the boron ball target.

Figure 2:
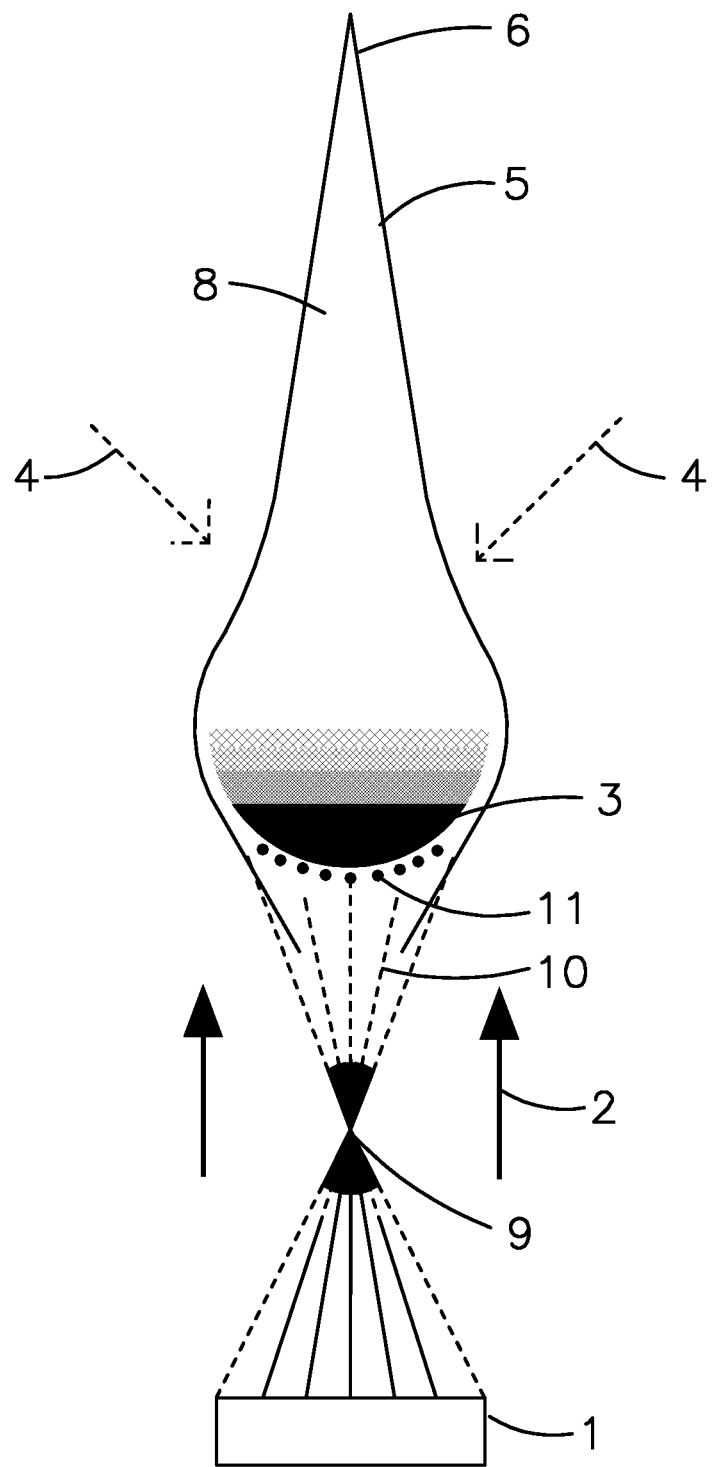
FIG. 2 is a schematic representation of the formation of boron containing nanotubes in the combined laser-gas flow levitation process.

FIG. 2 is a schematic representation of the formation of boron containing nanotubes in the combined laser-gas flow levitation process. As FIG. 2 shows a boron ball target 3 which has a somewhat spherical or teardrop shape and a ball underside 11 is placed in a nitrogen gas flow 2 introduced below the boron ball target 3 and creating a circulation flow upward toward the boron ball target 3. First laser beam 10 from the laser 1 impinges the boron ball target 3 from below on the ball underside 11. The first laser beam 10 is focused though optics to give optical focal point 9 positioned between the laser 1 and the boron ball target 3 which facilitates keeping the boron ball target 3 in the correct location as boron evaporates from the boron ball target 3. As the first laser beam 10 impinges the boron ball target, the boron ball target heats to the melting point and evaporates, boron vapor plume 8 thus formed rises upward from the boron ball target 3 and contacts the nitrogen gas flow 2 creating a nanotube formation interface 5 in which boron nitride nanotubes are formed. If carbon is introduced into the system as a carbon rich gas mixed with the nitrogen gas flow 2 and/or as a component of the boron ball target boron-carbon-nitrogen nanotubes of the general formula $B_xC_yN_z$ may be formed in the nanotube formation interface 5. The nanotubes thus formed are carried upward by the boron vapor plume 8 and/or nitrogen gas flow 2 and are collected at the terminus 6 of the boron vapor plume 8.

An at least one second laser beam 4 is positioned to impinge from above and slightly to the side onto the upper portion of the boron ball target 3 and/or forming boron vapor plume 8 to facilitate balancing the sideways or horizontal force acting on the boron ball target 3 and maintaining the boron ball target 3 in a balanced substantially constant position. FIG. 2 shows two second laser beams which is representative of a typical system. The at least one second laser beam may be produced by beam splitting a beam from a second laser, produced by a plurality of lasers or produced by splitting the beam of the laser 1 to give a plurality of beams. If beam splitting is employed, it is preferable the each of the plurality of the resulting beams be independently controllable. As the boron ball target 3 is heated from ambient temperature to about 4000° C. the evaporation begins and then continues as the boron ball target 3 evaporates, the power of the first laser beam 10 below and the nitrogen gas flow 2 are adjusted to stabilize the position of the boron ball target. In one embodiment evaporation of the boron ball target 3 continues until the boron ball target 3 is entirely evaporated.

As shown in FIG. 2, one laser is used to produce the first laser beam that impinges on the bottom of the boron ball target, however, as one skilled in the art will appreciate, in some embodiments the use of a plurality of lasers to produce the first laser beam that impinges on the bottom of the boron ball may be desirable. Similarly, the at least one second laser beam that impinges onto the upper portion of the boron ball target from above and slightly to the side may be produced by a plurality of lasers or alternatively the beam of a single laser may be split into a plurality of beams and directed through optics to produce light that impinges at more than one position on the upper portion of the boron ball target and/or boron vapor plume. Alternatively, laser beam from a single laser may be split to provide multiple laser beams that can be used for one or more of the first laser beam and the at least one second laser beam. If beam splitting is employed it is preferable to that each of the resulting beams is independently controllable.

The boron ball target should be maintained in a nearly constant position (i.e. a reaction position) throughout the process. The reaction position comprises a vertical reaction position and a horizontal reaction position. The reaction position is maintained by balancing the four main forces on the boron ball target. The four main forces in effect on the ball are gravity, light pressure, gas flow including buoyancy, and evaporation.

Gravity.

The boron ball target is forced down due to the force of gravity. As the boron ball evaporates (vaporizes to form the boron vapor plume), the force of gravity is lessened. The force of gravity is: $F_g = mg$ where m is the mass of the ball and g is the acceleration due to gravity (i.e. 9.8 m/s$^2$).

Light Pressure.

Light carries momentum (i.e., $p = E/c$, or in terms of power of the light, P, force is $F_l = P/c$ where $F_l$ is the force of light, and c is the speed of light). When light is absorbed, the impacted object absorbs the momentum. If light is perfectly reflected, the momentum is twice as much. The net force of the light along the vertical is also dependent on the direction of the light. For the geometry shown in FIG. 2, the light coming from below has most of its force directed upward to the boron ball target and light coming from above and slightly to the side of the boron ball target has most of its force substantially directed towards the sides of the boron ball target and/or boron vapor plume such that the net sideways or horizontal force on the boron ball target is balanced so that the net sideways or horizontal force on the boron ball target is zero. As the boron ball target is very hot during the process there is a small downward net force from the radiated light coming from the top of the boron ball target being slightly more radiated than the radiated light from the bottom of the boron ball target.

Gas Flow.

There are two sources of gas flow. These sources are: (1) a fan or pump system that moves the nitrogen gas or combinations of nitrogen gas and carbon bearing gas in the desired direction and (2) the hot boron ball target and boron vapor plume heating the surrounding gas flow thereby creating a convective flow. The sum of the two sources is maintained such that gas going around the boron ball target remains non-turbulent, i.e. laminar flow conditions. This speed is dependent on the size of the ball, the gas temperature near the ball and the gas pressure. The range of applicable gas pressure is from about atmospheric of about 15 psi to around 20,000 psi, the pressure where the boron ball would become buoyant and simply float up and away with pressures of about 100 to about 2,000 psi preferred in some embodiments. The vertical flow force, $F_f$, from the gas flow is dependent on the diameter of the boron ball, buoyancy effects, the speed of the gas flow, the gas pressure and the temperature.

Evaporation.

When the ball approaches its vaporization temperature, i.e. about 4000° C., it begins to produce boron vapor (i.e. a boron vapor plume). The cooler part of the boron ball target will be near the bottom of the boron ball target due to the additional heat being provided by the laser(s) producing light from above and slightly to the side and the tendency of the hotter material which is lighter to rise to the top. The preferential release of boron as boron vapor on the top of the boron ball target will create a net evaporative force, $F_e$, downwards on the ball though there will be some upwards evaporative force from boron evaporating on the bottom side of the ball.

The process for producing boron nitride nanotubes and/or boron-carbon-nitrogen nanotubes of the general formula $B_xC_yN_z$) comprises the steps of:

1. A room temperature boron ball target is placed into a reaction position. Suitable methods for placing the boron ball target into position include, but are not limited to, using a boron target ball that has slight whiskers attached that are used to mechanically place and hold the ball in position until heating is initiated, or alternatively propelling the boron ball target upward such that the top of its near parabolic arc (slightly modified by drag) is at the desired position.

2. Once the boron ball target is in position, a laser is activated to produce a laser beam of a sufficient force to add the additional force (in addition to buoyancy and the gas flow forces) needed to balance the downward force due to gravity and light from above and to side of the boron ball target on the boron ball target 3. The boron ball target heats and as it heats it acquires additional upwards force due to convection heating of the gas flow. There are several sources of feedback to stabilize the position of the boron ball target in the reaction position. First, the first laser beam is focused at a point below the boron ball target such that some of the light near the periphery of the boron ball target impinges at an angle such that the vertical force on the boron ball target increases as the boron ball target moves downwards closer to the focal point. Secondly, feedback from the location of the boron ball target is monitored and the power of the first laser beam and the rate of flow of the gas are adjusted based on this feedback to keep the forces on the ball vertically balanced. Thirdly, the horizontal position of the boron ball target is also monitored and the strength of the at least one second laser beam's horizontal components of force is adjusted to keep the ball directly above the focal point of the first laser beam coming from below. The horizontal forces are due to a combination of the force of the at least one second laser beam and the differential evaporation rates in the horizontal directions. Any combination or all of the effects may be employed to provide feedback for maintaining the boron ball target in a substantially stable reaction position.

4. When the boron ball target reaches the vaporization temperature of boron, the power levels of the laser(s) are adjusted in real-time to stabilize both the vaporization rate and the position of the boron ball target.

5. As the boron ball target continues to vaporize the laser(s) are further adjusted in real-time to stabilize both the vaporization and position of the boron ball target by balancing the forces of gravity, impinging light, gas flow and evaporation acting on the boron ball target (i.e. the sum of the forces gravity, impinging light, gas flow and evaporation acting on the boron ball target should be about zero.)

6. The vaporized boron formed rises upward from the boron ball target as a plume of boron vapor and contacts the nitrogen gas flow creating a nanotube formation interface in which nanotubes are formed. The nanotubes thus formed are carried upward by the boron vapor plume and/or nitrogen gas flow and are collected at the terminus of the boron vapor plume.

In a preferred embodiment the steps of the process described above are performed sequentially in the order set forth above. The process can continue until the boron ball target becomes so small that it is carried away in the gas flow. The process may be repeated by obtaining a new boron ball target.

The process for the production of boron-carbon-nitrogen and nanotubes of the general formula $B_xC_yN_z$ formation comprises essentially the same steps as for the production of few-walled boron nitride nanotubes. The specific compositional empirical formula of the $B_xC_yN_z$ nanotubes is determined by the relative amounts of boron, carbon and nitrogen used. For boron nitride nanotubes a boron-containing target of compressed boron powder, compressed boron nitride powder, and mixtures thereof, for example is suitable and no carbon is used in either the target or the gas flow. For nanotubes of the general formula $B_xC_yN_z$, carbon is introduced into the reaction. The carbon may be a solid component of the target, a carbon rich gas, mixture of carbon rich gases or a combination thereof. When a carbon rich gas is used, the proportion used is readily controlled by regulating the fractional pressure of the carbon rich gas in the nitrogen carbon rich gas mixture. Solid forms of carbon suitable for inclusion in the boron ball target are carbon fibers, carbon powder (carbon black) and mixtures thereof. Suitable carbon rich gases include, but are not limited to, hydrocarbons such as methane, ethane, ethylene, acetylene, substituted acetylenes, propane, propene, aromatic hydrocarbons such as benzene, toluene, xylene, aniline, and polyaromatic hydrocarbons, and combinations thereof.

Optionally, multiple types of carbon rich gases can be introduced simultaneously into the reaction or alternatively a combination of one or more carbon rich gases and solid carbon included in the boron ball target may be used a carbon source.

The boron target is thermally excited sufficiently to form atomic boron vapor. In targets containing carbon as well as boron, both the boron and carbon are vaporized. The inventors believe, without wishing to be bound to the theory, that the when a laser heats a boron (or a boron and carbon) target to form a boron (or boron and carbon) vapor plume in the presence of nitrogen, the nitrogen is disassociated in to atomic nitrogen and the boron nitride and/or $B_xC_yN_z$ nanotubes form at the interface between the boron (or boron and carbon) vapor and the atomic nitrogen. In the case in which solid carbon is intermixed with the boron in the target, the carbon vaporizes near the same temperature as boron and both mix in the formation. In the case in which a carbon rich gas (or gases) is used as the carbon source or a portion of the carbon source, the carbon rich gas dissociates into atomic carbon and atomic hydrogen intermixed with the atomic nitrogen. The atomic carbon joins with the atomic nitrogen and boron to form the $B_xC_yN_z$ nanotubes.

Further, the inventors believe, without wishing to be bound to the theory, that no chemical catalyst and/or catalytic surface is needed to initiate the formation of boron nitride and/or $B_xC_yN_z$ nanotubes. The boron nitride nanotubes appear to form spontaneously when hot boron vapor, and nitrogen are present and or $B_xC_yN_z$ nanotubes appear to form spontaneously when hot boron vapor, vaporized carbon and nitrogen are present. This renders the Inventors' process fundamentally less complicated than carbon nanotube production in which a gas-borne cloud or coated surface of catalytic particles must be produced and kept active during the growth process. Accordingly, unlike for carbon nanotubes, the Inventors' production of boron nitride and/or $B_xC_yN_z$ nanotubes is readily amendable to continuous production of material.

The inventors believe without wishing to be bound to the theory that their process is a factor of 100 to 1000 more efficient in energy and materials usage than existing methods as well as being a method for rapid production of quantities of nanotube material as compared to known methods.

Example 1

The following example is provided for illustrative purposes. For an example using a 1.5 mm diameter boron ball target, the downward force of gravity is about $3.5 \times 10^{-5}$ N. If an 8 kW laser is used to produce the light that impinges on the under side of the boron ball target the available upward force of the light is about $2.5 \times 10^{-5}$ N assuming that the force due to the reflection term roughly cancels the angular effect.

To balance the force in this example, the upward force needed for the gas buoyancy and flow and heating convection terms approaches $1.0 \times 10^{-5}$ N. The buoyancy component of the gas flow would be roughly equal to this at 5,000 psi so the pressure is kept below this level. For operational reasons (including safety) relying more on flow rather than buoyancy indicates that pressures of about 100 to about 2,000 psi can be used with suitable flow. As the laser power and hence force of the laser beam impinging on the bottom of the boron ball target can be rapidly changed, it is preferable in some embodiments to keep the gas low rate constant and vary the laser power to stabilize or maintain the reaction position of the boron ball target as boron evaporates from the boron ball target.

What is at present considered the preferred embodiment and alternative embodiments of the present invention has been shown and described herein. It will be obvious to those skilled in the art that various changes and modifications may be made therein without departing from the scope of the invention as defined by the appended claims.

What is claimed is:

1. A process for producing boron nitride nanotubes, the process comprising the steps:
   a. providing a boron ball target, a first laser beam having an adjustable power level and a gas flow comprising nitrogen;
   b. positioning the boron ball target in a reaction position above the first laser beam and in the gas flow, the reaction position comprising a vertical reaction position and a horizontal reaction position;
   c. adjusting the power level of the first laser beam to provide sufficient force from the first laser beam to the boron ball target to balance the force of gravity and the force of a light from above the boron ball target acting downward on the boron ball target and maintain the boron ball target in the vertical reaction position;
   d. heating the boron ball target with the first laser beam wherein the heating evaporates a portion of the boron ball target and forms a boron vapor plume;
   e. adjusting the power level of the first laser beam to maintain the heated boron ball target balanced in the reaction position as the boron vapor plume moves upward from the boron ball target;
   f. providing at least one second laser beam positioned above and to the side of the boron ball target, wherein the at least one second laser beam exerts a second laser beam force on the boron ball target to maintain the boron ball target in the horizontal reaction position; and
   g. forming a plurality of boron nitride nanotubes as the upward moving boron vapor plume contacts the nitrogen in the gas flow.

2. The process of claim 1, wherein the steps are performed in sequence.

3. The process of claim 1, wherein the boron ball target has attached whiskers which are positioned mechanically to position the boron ball target above the first laser beam.

4. The process of claim 1, wherein the boron ball target is positioned above the first laser beam by propelling the boron ball upward in a near parabolic arc of motion with a top wherein the top of the near parabolic arc of motion is at the reaction position.

5. The process of claim 1, wherein the heated boron ball target is acted upon by the forces of gravity, light, gas flow including buoyancy and evaporation and the forces are balanced such that the net force acting on the heated boron ball target is zero.

6. The process of claim 1, further comprising collecting the boron nitride nanotubes.

7. The process of claim 1, wherein the first laser beam is provided by a first laser and the at least one second laser beam is provided by at least one second laser.

8. The process of claim 1, wherein the first laser beam and the at least one second laser beam are provided by a single laser and wherein the single laser produces a single laser beam and wherein a first portion of the single laser beam forms the first laser beam and a second portion of the single laser beam forms the at least one second laser beam.

9. The process of claim 1, where in the gas flow is at a pressure of about 15 to about 20,000 psi.

10. The process of claim 1 wherein the gas flow is at a pressure greater than 5,000 psi.

11. The process of claim 1 wherein the gas pressure of said nitrogen is greater than 5,000 psi.

12. A process for producing boron-carbon-nitrogen nanotubes of the general formula $B_xC_yN_z$ the process comprising the steps;
  a. providing a boron ball target, a first laser beam having an adjustable power level, a gas flow comprising nitrogen, and a carbon source;
  b. positioning the boron ball target in a reaction position above the first laser beam and in the gas flow, the reaction position comprising a vertical reaction position and a horizontal reaction position;
  c. adjusting the power level of the first laser beam to provide sufficient force from the first laser beam to the boron ball target to balance the force of gravity and the force of a light from above the boron ball target acting downward on the boron ball target and maintain the boron ball target in the reaction position;
  d. heating the boron ball target with the first laser beam wherein the heating evaporates a portion of the boron ball target and forms a boron vapor plume and vaporizes the carbon source to form carbon atoms;
  e. adjusting the power level of the first laser beam to maintain the heated boron ball target balanced in the reaction position as the boron vapor plume moves upward from the boron ball target;
  f. providing at least one second laser beam positioned above and to the side of the boron ball target, wherein the at least one second laser beam exerts a second laser beam force on the boron ball target to maintain the boron ball target in the horizontal reaction position; and
  g. forming a plurality of boron-carbon-nitrogen nanotubes of the general formula $B_xC_yN_z$ as the upward moving boron vapor plume contacts the nitrogen in the gas flow and carbon atoms.

13. The process of claim 12, wherein the steps are performed in sequence.

14. The process of claim 12, wherein the boron ball target has attached whiskers which are positioned mechanically to position the boron ball target above the first laser beam.

15. The process of claim 12, wherein the boron ball target is positioned above the first laser beam by propelling the boron ball upward in a near parabolic arc of motion with a top wherein the top of the near parabolic arc of motion is at the reaction position.

16. The process of claim 12, wherein the heated boron ball target is acted upon by the forces of gravity, light, gas flow and evaporation and the forces are balanced such that the net force acting on the heated boron ball target is zero.

17. The process of claim 12, further comprising collecting the boron-carbon-nitrogen nanotubes of the general formula $B_xC_yN_z$.

18. The process of claim 12, wherein the first laser beam is provided by a first laser and the at least one second laser beam is provided by at least one second laser.

19. The process of claim 12, wherein the first laser beam and the at least one second laser beam are provided by a single laser and wherein the single laser produces a single laser beam and wherein a first portion of the single laser beam forms the first laser beam and a second portion of the single laser beam forms the at least one second laser beam.

20. The process of claim 12, wherein the boron ball target comprises boron and a carbon source.

* * * * *